(12) United States Patent
Fink

(10) Patent No.: US 10,071,646 B2
(45) Date of Patent: Sep. 11, 2018

(54) ELECTRICAL SYSTEM AND METHOD FOR OPERATING AN ELECTRICAL SYSTEM

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 117 days.

(21) Appl. No.: 15/114,550

(22) PCT Filed: Jan. 23, 2015

(86) PCT No.: PCT/EP2015/051325
§ 371 (c)(1),
(2) Date: Jul. 27, 2016

(87) PCT Pub. No.: WO2015/110566
PCT Pub. Date: Jul. 30, 2015

(65) Prior Publication Data
US 2016/0347197 A1    Dec. 1, 2016

(30) Foreign Application Priority Data

Jan. 27, 2015    (DE) .................. 10 2014 201 345

(51) Int. Cl.
*B60W 20/00*    (2016.01)
*B60L 11/18*    (2006.01)
(Continued)

(52) U.S. Cl.
CPC ....... *B60L 11/1853* (2013.01); *B60L 11/1855* (2013.01); *B60L 11/1864* (2013.01);
(Continued)

(58) Field of Classification Search
USPC ...................................... 701/22, 36
See application file for complete search history.

(56) References Cited

U.S. PATENT DOCUMENTS 5,345,154 A * 9/1994 King ................. B60K 6/46
318/139
5,397,991 A * 3/1995 Rogers ............ B60L 11/1861
320/125
(Continued)

FOREIGN PATENT DOCUMENTS

DE         100 57 259 A1    5/2002
DE    10 2005 038 746 A1    3/2007
(Continued)

OTHER PUBLICATIONS

International Search Report corresponding to PCT Application No. PCT/EP2015/051325, dated Apr. 21, 2015 (German and English language document) (7 pages).

*Primary Examiner* — Jonathan L Sample
(74) *Attorney, Agent, or Firm* — Maginot, Moore & Beck LLP

(57) ABSTRACT

The disclosure relates to an electrical system for a vehicle, comprising a low-voltage sub-network for at least one low-voltage load and comprising a high-voltage sub-network for at least one high-voltage load and an electric generator. The high-voltage sub-network has a battery which is designed to generate a high-voltage and output same to the high-voltage sub-network and which has at least two battery units with individual voltage taps. The high-voltage sub-network is connected to the low-voltage sub-network via a coupling unit which is designed to draw energy from the high-voltage sub-network and supply said energy to the low-voltage sub-network. The coupling unit is designed to selectively connect the battery units to the low-voltage sub-network. The disclosure further relates to a method for
(Continued)

operating an electrical system, to a motor vehicle, and to a battery management system and a computer program which are designed to carry out the method.

10 Claims, 5 Drawing Sheets

(51) Int. Cl.
    *B60R 16/033*     (2006.01)
    *H02J 7/00*     (2006.01)
    *B60W 20/13*     (2016.01)
    *B60W 10/26*     (2006.01)

(52) U.S. Cl.
CPC ........... *B60R 16/033* (2013.01); *B60W 10/26* (2013.01); *B60W 20/13* (2016.01); *H02J 7/0016* (2013.01); *H02J 7/0024* (2013.01); *H02J 7/0026* (2013.01); *B60L 2210/10* (2013.01); *B60L 2260/20* (2013.01); *B60L 2260/22* (2013.01); *B60L 2260/24* (2013.01); *B60L 2260/26* (2013.01); *Y02T 10/7005* (2013.01); *Y02T 10/7055* (2013.01); *Y02T 10/7061* (2013.01); *Y10S 903/907* (2013.01)

(56) References Cited

U.S. PATENT DOCUMENTS

| | | | | |
|---|---|---|---|---|
| 5,602,459 | A * | 2/1997 | Rogers | B60L 11/1861 320/134 |
| 5,642,270 | A * | 6/1997 | Green | B60L 11/126 363/17 |
| 5,710,699 | A * | 1/1998 | King | B60L 11/005 318/139 |
| 6,048,289 | A * | 4/2000 | Hattori | B60K 6/48 180/65.25 |
| 6,331,365 | B1 * | 12/2001 | King | B60L 11/1803 320/103 |
| 6,832,148 | B1 * | 12/2004 | Bennett | B60K 6/445 180/65.225 |
| 7,215,034 | B2 * | 5/2007 | Hino | B60R 16/03 180/65.1 |
| 8,076,794 | B2 * | 12/2011 | Proebstle | B60L 11/1868 307/10.1 |
| 9,077,269 | B2 * | 7/2015 | Nakamura | H02P 6/10 |
| 9,205,747 | B2 * | 12/2015 | Kawamura | B60L 3/0046 |
| 2001/0039230 | A1 * | 11/2001 | Severinsky | B60H 1/004 477/3 |
| 2005/0080523 | A1 * | 4/2005 | Bennett | B60K 6/445 701/22 |
| 2005/0251299 | A1 * | 11/2005 | Donnelly | B60L 7/08 701/19 |
| 2005/0258795 | A1 * | 11/2005 | Choi | B29C 45/7666 318/625 |
| 2005/0284676 | A1 * | 12/2005 | King | B60L 7/06 180/65.22 |
| 2006/0005739 | A1 * | 1/2006 | Kumar | B60L 7/06 105/35 |
| 2007/0164693 | A1 * | 7/2007 | King | B60K 6/28 318/109 |
| 2008/0121136 | A1 * | 5/2008 | Mari | B60L 11/02 105/35 |
| 2009/0015193 | A1 * | 1/2009 | Esaka | B60K 6/28 320/103 |
| 2009/0243522 | A1 * | 10/2009 | Suhama | B60L 7/16 318/376 |
| 2010/0019718 | A1 * | 1/2010 | Salasoo | B60L 3/0046 320/103 |
| 2010/0045220 | A1 * | 2/2010 | Yamada | B60K 6/445 318/400.15 |
| 2010/0255393 | A1 * | 10/2010 | Imai | B60L 11/1868 429/428 |
| 2011/0174561 | A1 * | 7/2011 | Bowman | B60K 6/46 180/65.245 |
| 2011/0213517 | A1 * | 9/2011 | Laws | B60W 10/26 701/22 |
| 2011/0246013 | A1 * | 10/2011 | Yee | B60L 11/1859 701/22 |
| 2012/0038216 | A1 * | 2/2012 | Berry | B60L 11/005 307/77 |
| 2012/0041630 | A1 * | 2/2012 | Yamamoto | B60K 6/365 701/22 |
| 2012/0056478 | A1 * | 3/2012 | Omoto | B60L 3/0046 307/11 |
| 2012/0072066 | A1 * | 3/2012 | Kato | B60K 6/365 701/22 |
| 2012/0143411 | A1 * | 6/2012 | Koprubasi | B60L 11/12 701/22 |
| 2012/0143425 | A1 * | 6/2012 | Yamamoto | B60K 6/365 701/22 |
| 2012/0200152 | A1 * | 8/2012 | Schneider | B60K 6/48 307/9.1 |
| 2012/0212160 | A1 * | 8/2012 | Shindo | B60L 3/0007 318/139 |
| 2013/0274984 | A1 * | 10/2013 | Justin | B60W 10/26 701/22 |
| 2015/0217640 | A1 * | 8/2015 | Bissontz | B60L 11/1868 307/9.1 |
| 2015/0239457 | A1 * | 8/2015 | Dziuba | B60W 20/10 701/22 |
| 2015/0295504 | A1 * | 10/2015 | Tanahashi | H02M 3/33584 307/24 |
| 2016/0311326 | A1 * | 10/2016 | Steele | B60L 11/18 |

FOREIGN PATENT DOCUMENTS

| | | |
|---|---|---|
| DE | 10 2008 002 177 A1 | 12/2009 |
| DE | 10 2009 024 345 A1 | 1/2011 |
| DE | 10 2009 028 147 A1 | 2/2011 |
| DE | 10 2009 046 305 A1 | 5/2011 |
| DE | 10 2009 046 553 A1 | 5/2011 |
| DE | 10 2010 014 104 A1 | 10/2011 |
| DE | 10 2012 010 711 A1 | 3/2013 |
| DE | 10 2012 003 309 A1 | 8/2013 |
| EP | 1 562 252 A1 | 8/2005 |
| EP | 2 053 717 A2 | 4/2009 |
| EP | 2 496 437 | 5/2011 |
| WO | 01/37393 A1 | 5/2001 |
| WO | WO-0137393 A1 * | 5/2001 ............ H02J 7/0024 |
| WO | 2011/055217 A2 | 5/2011 |

* cited by examiner

ELECTRICAL SYSTEM AND METHOD FOR OPERATING AN ELECTRICAL SYSTEM

This application is a 35 U.S.C. § 371 National Stage Application of PCT/EP2015/051325, filed on Jan. 23, 2015, which claims the benefit of priority to Serial No. DE 10 2014 201 345.3, filed on Jan. 27, 2014 in Germany, the disclosures of which are incorporated herein by reference in their entirety.

BACKGROUND

The disclosure relates to an onboard electrical system and to a method for operating an onboard electrical system for a motor vehicle.

In addition, a motor vehicle having such an onboard electrical system is specified, and also a battery management system and a computer program that are set up to carry out the methods described.

In motor vehicles having an internal combustion engine, an onboard electrical system that is operated at 12 V as standard is provided for supplying power to the electric starter for the internal combustion engine and to further electrical apparatuses of the motor vehicle. When starting the internal combustion engine, the onboard electrical system is used to provide a voltage from a starter battery for a starter that starts the internal combustion engine when a switch is closed, for example by an appropriate starter signal. Once the internal combustion engine has been started, it drives an electrical generator that then produces a voltage of approximately 12 V and provides it for the various electrical loads in the vehicle via the onboard electrical system. In so doing, the electrical generator also recharges the starter battery loaded by the starting process. When the battery is charged via the onboard electrical system, the actual voltage may also be above the rated voltage, e.g. at 14 V or at 14.4 V. The onboard electrical system at a voltage of 12 V or 14 V is also referred to as a low voltage onboard electrical system within the context of the present disclosure.

It is known practice to use a further onboard electrical system having a rated voltage of 48 V in electric and hybrid vehicles, said system also being referred to as a high voltage onboard electrical system within the context of the disclosure.

SUMMARY

According to the disclosure, an onboard electrical system for a motor vehicle comprises a low voltage subsystem for at least one low voltage load and a high voltage subsystem for at least one high voltage load and an electrical generator, wherein the high voltage subsystem is connected to the low voltage subsystem by means of a coupling unit that is set up to draw power from the high voltage subsystem and to supply it to the low voltage subsystem, wherein the high voltage subsystem has a battery that is set up to produce the high voltage and to output it to the high voltage subsystem and that has at least two battery units having individual voltage taps that are routed to the coupling unit. In this case, provision is made for the coupling unit to be set up to selectively connect the battery units to the low voltage subsystem.

The disclosure has the advantage that the low voltage subsystem can operate electrical loads that are designed for a low first voltage, and high power loads have the high voltage subsystem available, i.e. the onboard electrical subsystem having the voltage that is increased in comparison with the first voltage. The supply of power to the low voltage subsystem is overlaid on the charging and discharge processes in the high voltage subsystem. The supply of power to the low voltage subsystem via the high voltage subsystem takes place unidirectionally in this case, i.e. the coupling unit provides the transfer of power preferably only in one direction.

In the present description, the terms "battery" and "battery unit" are used for storage battery or storage battery unit, in a manner adjusted to customary usage. The battery comprises one or more battery units, which can denote a battery cell, a battery module, a module string or a battery pack. In this case, the battery cells are preferably spatially combined and connected to one another in terms of circuitry, for example interconnected serially or in parallel to form modules. Multiple modules can form what are known as battery direct converters (BDCs) and multiple battery direct converters can form a battery direct inverter (BDI).

The onboard electrical system can be used both for static applications, e.g. for wind power installations, and in vehicles, e.g. in hybrid and electric vehicles. In particular, the onboard electrical system can be used for vehicles that have start/stop systems.

The presented system, i.e. the onboard electrical system and the battery management system, is particularly suitable for use in vehicles that have a 48 volt generator and a 14 volt starter, the 14 volt starter preferably being designed for start/stop systems.

The presented system is particularly suitable for use in vehicles that have a boost recuperation system (BRS). In boost recuperation systems (BRS), electric power is obtained during braking processes, during descents or when coasting so as thereby to supply power to the electrical loads. The BRS increases the efficiency of the system, which means that fuel can be saved and emissions can be reduced. The battery in the high voltage subsystem either supports the internal combustion engine, this being referred to as what is known as boost, or is even used for purely electric driving for short distances at low speeds, e.g. in the case of electric parking and exit from a parking space.

Advantageous developments and improvements in the subject matter specified in the disclosure are possible by virtue of the measures described herein.

It is thus advantageous if the selectively connectable battery units are each designed to provide the low voltage. The battery units can thus be used alternately to provide the low voltage, e.g. in order to support a start/stop system, which results in an increased life for the battery unit.

According to one preferred embodiment, the coupling unit has at least one switch with reverse blocking capability. Preferably, the switches with reverse blocking capability are suitable for connecting and disconnecting a selectively connectable battery unit. These switches have the property that they allow a flow of current only in one direction in the "on" state and can accept a block voltage having both polarities in the "off" state.

According to one preferred embodiment, the low voltage subsystem has at least one energy store that is set up to produce the low voltage and to output it to the low voltage subsystem. The energy store may also be designed as a double layer capacitor. Since, according to some embodiments, the low voltage subsystem can be operated solely with the battery units of the high voltage subsystem, the energy store arranged in the low voltage subsystem is redundant for the onboard electrical system, in principle. However, the use of the energy store arranged in the low voltage subsystem is particularly advantageous when the battery units of the high voltage subsystem comprise lithium ion batteries. Lithium ion batteries have the disadvantage that they cannot provide the optimum power in certain areas of use or situations, particularly at low temperatures, for example. The energy store arranged in the low voltage subsystem compensates for this, so that a system that is durable even in more extreme situations is provided.

According to one preferred embodiment, the low voltage subsystem has at least one capacitor. The capacitor is preferably set up to stabilize the low voltage in the event of a change of connected battery unit. In this case, the dimensioning of the capacitor is preferably chosen according to $$C = \frac{I_{max} \cdot t_{changeover}}{\Delta U_{max}},$$

where $I_{max}$ is the maximum onboard electrical system current that should flow in the low voltage subsystem during changeover processes, $t_{changeover}$ is the period of time during which no battery unit is available for the supply of power, and $\Delta U_{max}$ is the maximum permissible change in the onboard electrical system voltage during the changeover process. The capacitor is furthermore preferably also suitable as an energy store that is set up to produce the low voltage, and to output it to the low voltage subsystem, at least in the short term.

According to one preferred embodiment, the low voltage subsystem has a starter. The starter is preferably designed for start/stop systems and set up to operate a switch to start an internal combustion engine.

In the case of a method according to the disclosure for operating an onboard electrical system for a motor vehicle, wherein the onboard electrical system has a low voltage subsystem for at least one low voltage load and a high voltage subsystem for at least one high voltage load and an electrical generator, wherein the high voltage subsystem is connected to the low voltage subsystem by means of a coupling unit that is set up to draw power from the high voltage subsystem and to supply it to the low voltage subsystem, wherein the high voltage subsystem has a battery that is set up to produce the high voltage and to output it to the high voltage subsystem, and that has at least two battery units having individual voltage taps that are routed to the coupling unit, wherein the coupling unit is set up to selectively connect the battery units to the low voltage subsystem, provision is made for that battery unit that has the highest state of charge to be connected to the low voltage subsystem.

The method according to the disclosure has the advantage that, during operation, a state is entered in which the battery units have approximately one and the same state of charge. The effect achieved by this is particularly that the cells age uniformly, i.e. have one and the same internal resistance and one and the same capacitance, for example. In this case, the supply of power to the low voltage subsystem changes from one battery unit to that battery unit that has a correspondingly higher state of charge than the battery unit that is currently used for supplying power to the low voltage subsystem.

A further advantage is that the requirements for the starting processes in the low voltage subsystem are always met, since that battery unit that currently has the best performance is invariably used. Since the supply of power to the low voltage subsystem is overlaid on the charging and discharge processes in the high voltage subsystem and the supply of power to the low voltage subsystem takes place unidirectionally, the method according to the disclosure ensures that the battery unit having the highest state of charge is always discharged more quickly or charged more slowly than the other battery elements. This results in the states of charge of the battery elements being balanced.

According to one preferred embodiment, a change of connected battery unit takes place when a threshold value for a state of charge difference in the battery units is exceeded. The effect achieved thereby is that when the state of charge of the battery units is the same or similar, there is no rapid, constant changing from one battery unit to the next, followed by a change back as soon as the unused battery unit has the highest state of charge in each case. Particularly preferably, the threshold value for the state of charge difference in the battery units is a defined value of between 0.5% and 20%, preferably between 1% and 5%, particularly preferably approximately 2%.

According to one preferred embodiment, the change of connected battery unit takes place by virtue of a current-carrying battery unit being disconnected in a first step and, thereafter, a selected further battery unit being connected in a second step. An advantage is obtained particularly when the coupling unit has switches with reverse blocking capability that are power switches designed to be on. The manner of operation of the switches with reverse blocking capability means that, when the switches are operated simultaneously, the positive pole of the low voltage subsystem would be connected to the higher potential of the two battery units during the switching phase, and the negative pole of the onboard electrical system would be connected to the lower potential of the two battery units, resulting in an increased voltage. The proposed switching strategy prevents larger voltages than the specification of the low voltage subsystem allows from being provided for the low voltage subsystem for a short time. Furthermore, the advantageous changeover concept prevents a brief rise in the low voltage during changeover processes in the coupling unit used. In conjunction with a buffer device, which is in the form of a capacitor in the low voltage subsystem, for example, the voltage dip in the low voltage subsystem is additionally advantageously limited.

The voltage dip in the low voltage subsystem can additionally advantageously be decreased if changeover is effected at times of which the onboard electrical system current is as small as possible. This can be accomplished by evaluating a signal for the onboard electrical system current and actuating the switches of the coupling unit on the basis thereof, for example. Furthermore, synchronization to a load management system can also be effected in order to disconnect high power loads, such as e.g. heating systems, temporarily without losses of comfort in order to allow the changeover process for the battery units without a significant voltage dip.

According to the disclosure, a computer program is furthermore proposed, according to which one of the methods described herein is performed when the computer program is executed on a programmable computer device. The computer program may be a module for implementing a device for operating an onboard electrical system or a module for implementing a battery management system of a vehicle, for example. The computer program can be stored on a machine-readable storage medium, for example on a permanent or rewritable storage medium, or in association with a computer device, for example on a portable memory, such as a CD-ROM, DVD, BlueRay disk, a USB stick or a memory card. Additionally and alternatively, the computer program can be provided on a computer device, such as on a server or a cloud server, for example, for download, for example via a data network, such as the Internet, or a communication link, such as a telephone line or a wireless connection, for example.

According to the disclosure, a battery management system (BMS) is furthermore provided that has devices in order to perform one of the methods described for operating one of the onboard electrical systems described. In particular, the battery management system has a unit that is set up to ascertain the state of charge of the battery units, and particularly the battery unit having the highest state of charge, and a unit that is set up to actuate the coupling unit such that battery units are selectively connected to the low voltage subsystem, particularly those having the highest state of charge.

According to a further embodiment, the battery management system has a further unit that is set up to ascertain the exceeding of a threshold value for a state of charge difference in the battery units so as then to carry out a change of the connected battery unit by means of the coupling unit.

According to the disclosure, a motor vehicle is furthermore specified, having an internal combustion engine and an onboard electrical system as described previously.

The disclosure provides an inexpensive onboard electrical system having a lithium ion battery system for vehicles that have a high voltage subsystem, for example with a 48 volt generator, and a low voltage subsystem, for example with a 14 volt starter, and a boost recuperation system with unidirectional supply of power to the low voltage subsystem. In this case, a potential-isolating DC/DC converter, and also the lead acid battery, can be dispensed with in comparison with known systems. Given suitable design, the boost recuperation system can store much more energy in comparison with BRS systems that are currently under development, and can thereby recover more electric power in the system during longer braking processes or descents.

The system is furthermore distinguished by a low volume, a low weight and a long life. The low voltage subsystem designed to have multiple redundancy means that there is greater availability in the system, allowing high power requirements even for cold starting processes.

The presented method according to the disclosure comprises an operating strategy that allows the supply of power to the low voltage subsystem and provides electric power for starting processes. In this case, the storage of electric power is optimized such that as much electric power as possible can be recovered during a braking process and the battery can be charged with the highest possible powers in the process.

Furthermore, the storage of electric power during recuperation processes is permitted and as much electric power as possible is provided during boost processes. Cold starting processes and start/stop processes can be performed at high power, if required with rapid repetition.

BRIEF DESCRIPTION OF THE DRAWINGS

Exemplary embodiments of the disclosure are presented in the drawings and explained in more detail in the description below. In the drawings.

DETAILED DESCRIPTION

Figure 1:
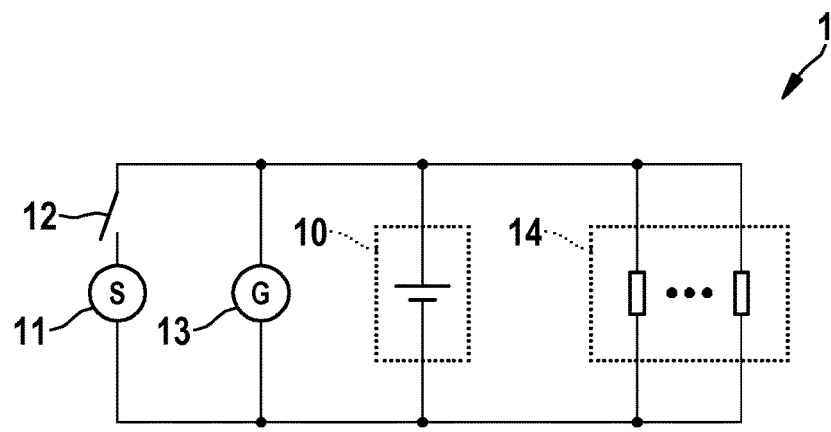
FIG. 1 shows a low voltage onboard electrical system according to the prior art.

FIG. 1 shows an onboard electrical system 1 according to the prior art. When starting an internal combustion engine, the onboard electrical system 1 is used to provide a voltage from a starter battery 10 for a starter 11 that starts the internal combustion engine (not shown) when a switch 12 is closed, for example by an appropriate starter signal. Once the internal combustion engine has been started, it drives an electrical generator 13 that then produces a voltage of approximately 12 volts and provides it for the various electrical loads 14 in the vehicle via the onboard electrical system 1. In so doing, the electrical generator 13 also recharges the starter battery 10 loaded by the starting process.

Figure 2:
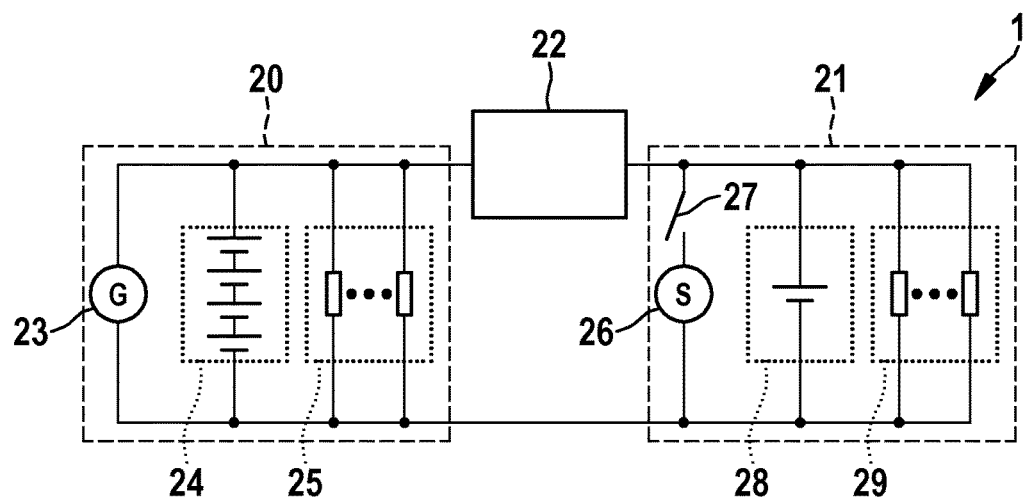
FIG. 2 shows an onboard electrical system with a high voltage subsystem and a low voltage subsystem and a unidirectional, potential-isolating DC/DC converter.

FIG. 2 shows an onboard electrical system 1 with a high voltage subsystem 20 and a low voltage subsystem 21 and a unidirectional, potential-isolating DC/DC converter 22 that forms a coupling unit between the high voltage subsystem 20 and the low voltage subsystem 21. The onboard electrical system 1 may be an onboard electrical system of a vehicle, particularly a motor vehicle, transport vehicle or forklift truck.

The high voltage subsystem 20 is, for example, a 48 volt onboard electrical system having an electrical generator 23 that can be operated by an internal combustion engine (not shown). In this exemplary embodiment, the generator 23 is designed to take a rotary movement of the engine of the vehicle as a basis for producing an electric power and supplying it to the high voltage subsystem 20. The high voltage subsystem additionally comprises a battery 24 that may be in the form of a lithium ion battery, for example, and that is set up to output the necessary operating voltage to the high voltage subsystem. The high voltage subsystem 20 contains further load resistors 25 that may be formed by at least one, preferably by a plurality of, electrical load(s) of the motor vehicle, for example, that are operated at the high voltage.

The low voltage subsystem 21, which is arranged on the output side of the DC/DC converter 22, contains a starter 26 that is set up to close a switch 27 in order to start the internal combustion engine, and an energy store 28 that is set up to provide the low voltage at the level of 14 volts, for example, for the low voltage subsystem 21. The low voltage subsystem 21 contains further loads 29 that are operated at the low voltage. By way of example, the energy store 28 comprises electrochemical cells, particularly those of a lead acid battery, which usually has a voltage of 12.8 volts in the fully charged state (state of charge, SOC=100%). When the battery is discharged (state of charge, SOC=0%), the energy store 28 has a terminal voltage of typically 10.8 volts in the unloaded state. During driving mode, the onboard electrical system voltage in the low voltage subsystem 21 is approximately in the range between 10.8 volts and 15 volts, depending on the temperature and the state of charge of the energy store 28.

The input side of the DC/DC converter 22 is connected to the high voltage subsystem 20 and to the generator 23. The output side of the DC/DC converter 22 is connected to the low voltage subsystem 21. The DC/DC converter 22 is designed to receive a DC voltage received on the input side, for example a DC voltage at which the high voltage subsystem is operated, for example between 12 and 48 volts, and to produce an output voltage that is different than the voltage received on the input side, particularly to produce an output voltage that is lower than the voltage received on the input side, for example 12 V or 14 V.

Figure 3:
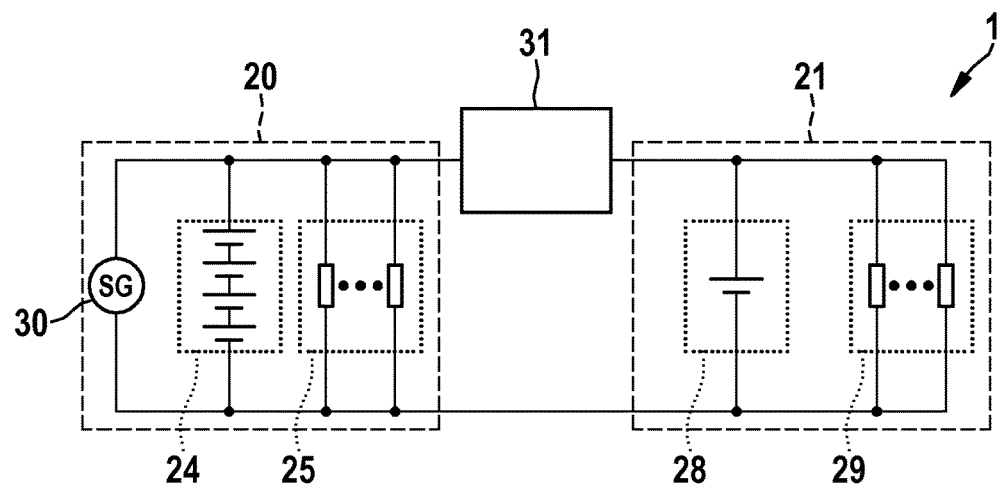
FIG. 3 shows an onboard electrical system with a high voltage subsystem and a low voltage subsystem and a bidirectional, potential-isolating DC/DC converter.

FIG. 3 shows an onboard electrical system 1 with a high voltage subsystem 20 and a low voltage subsystem 21 that are connected by a bidirectional, potential-isolating DC/DC converter 31. The onboard electrical system 1 shown is essentially designed in the manner of the onboard electrical system shown in FIG. 2, wherein the generator is incorporated in the high voltage subsystem and a DC/DC converter 31, which is of potential-isolating design, is used for transferring power between the onboard electrical subsystems 20, 21. Both subsystems 20, 21 furthermore contain batteries 24, 28 and loads 25, 29, as described with reference to FIG. 2. Essentially, the system shown in FIG. 3 is distinguished by virtue of the incorporation of the starter. While the starter 26 is arranged in the low voltage subsystem 21 in the system shown in FIG. 2, and, as a result, the DC/DC converter 22 may be of unidirectional design for transporting power from the high voltage subsystem 20 to the low voltage subsystem 21, a starter generator 30 is used in the high voltage subsystem 20 in the case of the architecture shown in FIG. 3. In this case, the DC/DC converter 31 is of bidirectional design, so that the lithium ion battery 24 can be charged via the low voltage subsystem 21 if need be. The starting assistance for the low voltage vehicle is then provided by means of the low voltage interface and the DC/DC converter 31.

Figure 4:
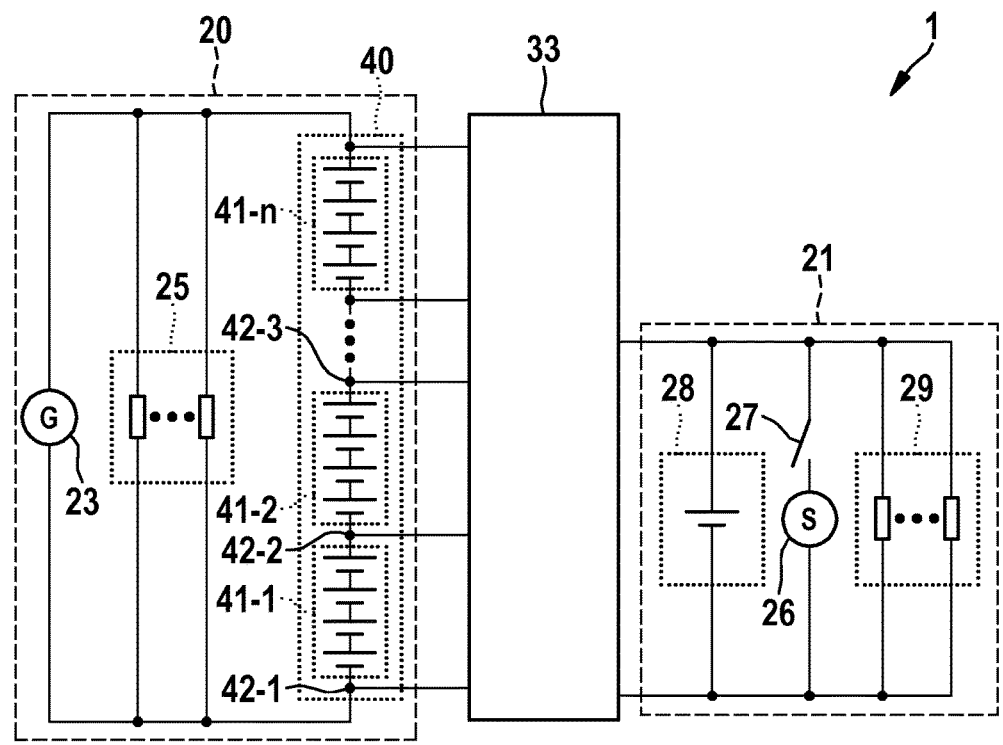
FIG. 4 shows an onboard electrical system with a high voltage subsystem and a low voltage subsystem and a unidirectional, electrochemical non-isolating DC/DC converter.

FIG. 4 shows an onboard electrical system 1 with a high voltage subsystem 20 and a low voltage subsystem 21, for example an onboard electrical system 1 of a vehicle, particularly of a motor vehicle, a transport vehicle or forklift truck. The onboard electrical system 1 is particularly suitable for use in vehicles with a 48 volt generator, a 14 volt starter and a boost recuperation system.

The high voltage subsystem 20 comprises a generator 23 that can be operated by an internal combustion engine (not shown). The generator 23 is designed to take a rotary movement of the engine of the vehicle as a basis for producing electric power and supplying it to the high voltage subsystem 20. The high voltage subsystem 20 contains load resistors 25 that may be formed by at least one, preferably by a plurality of, electrical load(s) of the motor vehicle, for example, that are operated at the high voltage.

The high voltage subsystem 20 furthermore comprises a battery 40 that may be in the form of a lithium ion battery, for example, and that is set up to output the operating voltage of 48 volts to the high voltage subsystem. At a rated voltage of 48 volts, the lithium ion battery 40 preferably has a minimum capacity of approximately 15 Ah in order to be able to store the required electric power.

The battery 40 has multiple battery units 41-1, 41-2, . . . , 41-n, wherein the battery units 41 have multiple associated battery cells that are usually connected in series and in some cases are additionally connected in parallel with one another in order to obtain the requisite performance and power data with the battery 40. The individual battery cells are lithium ion batteries with a voltage range from 2.8 to 4.2 volts, for example.

The battery units 41-1, 41-2, . . . , 41-n have associated individual voltage taps 42-1, 42-2, . . . , 42-n+1 via which the voltage is supplied to a coupling unit 33. When the battery units 41-1, 41-2, . . . , 41-n are connected in series, as shown in FIG. 4, the individual voltage taps 42 are arranged between the battery units 41, and one at each of the ends of the battery 40. When the number of battery units is n, this results in n+1 taps 42. The additional individual voltage taps 42 divide the lithium ion battery 40 into multiple battery units 41-1, 41-2, . . . 41-n, which can also be referred to as battery elements within the context of the disclosure. The individual voltage taps 42 are chosen such that the battery units 41 each have a voltage at which the low voltage subsystem 21, i.e. the 14 volt onboard electrical system, can be supplied with power. The individual voltage taps 42 of the battery units 41 are supplied to the coupling unit 33, as shown in FIG. 4. The coupling unit 33 has the task of connecting at least one of the battery units 41 of the battery 40 to the low voltage subsystem 21 for the purpose of operating or supporting the latter.

The coupling unit 33 couples the high voltage subsystem 20 to the low voltage subsystem 21 and, on the output side, provides the low voltage subsystem 21 with the necessary operating voltage, for example 12 V or 14 V. The design and operation of the coupling unit 33 are described with reference to FIGS. 5 to 7.

The low voltage subsystem 21 comprises the low voltage loads 29, which are designed for operation at 14 V voltage, for example. The low voltage subsystem 21 also has the starter 26, which is set up to operate the switch 27 in order to start the internal combustion engine.

To supply power to the starter in the low voltage subsystem, specifically in the case of a cold start for the vehicle, for example, there is a further energy store 28 available in the low voltage subsystem 21. The energy store 28, for example a battery, can deliver very high currents for a short time and relieves the load on the lithium ion battery 40 in the starting phases. Specifically the effects of the known weaknesses of lithium ion batteries, that they cannot output high currents at low temperatures, are lessened through the use of the energy store 28 in the system shown in FIG. 4. If the energy store 28 is embodied as a double layer capacitor, then the starting currents, even in a high total number, can be provided over the entire life of the battery and even for individual starting processes, if need be also repeatedly in succession, i.e. in the event of an unsuccessful starting attempt, after the power store has recharged. This allows a system to be implemented that has very high availability for electric power in the low voltage subsystem 21 and can output very high power for a short time, i.e. is optimized for high performance. The high power store 28 furthermore fulfils the purpose of avoiding overvoltages when the battery units 41 are changed over. If the energy store 28 used is a capacitor, then the dimensioning of said capacitor is preferably:

$$C = \frac{I_{max} \cdot t_{changeover}}{\Delta U_{max}},$$

where $I_{max}$ is the maximum onboard electrical system current that can flow in the onboard electrical system during the changeover processes, $t_{changeover}$ is the period of time during which no battery unit 41 is available for the supply of power, and $\Delta U_{max}$ is the maximum permissible change in the onboard electrical system voltage during the changeover process.

According to one embodiment, provision is made for the lithium ion battery 40 to undertake the supply of power to quiescent current loads, which are shown as loads 25, 29, when the vehicle is switched off. By way of example, provision may be made for the requirements of what is known as the airport test to be met in this case, wherein the vehicle can still be started after a standing time of 6 weeks and wherein, during the standing time, the battery provides the quiescent currents from the low voltage loads 29 in the low voltage subsystem 21 so that a theft warning system is supplied with power, for example.

The onboard electrical system shown in FIG. 4 can additionally comprise a battery management system (BMS) (not shown). The battery management system comprises a controller that is set up to capture measurement data about temperatures, voltages provided, currents output and states of charge of the battery 40 or of the battery units 41, to process them and to make statements about the state of health of the battery 40, for example, therefrom. In this case, the battery management system comprises a unit that is set up to regulate the coupling unit 33 such that it can selectively connect the battery units 41 in the low voltage subsystem 21.

Figure 5:
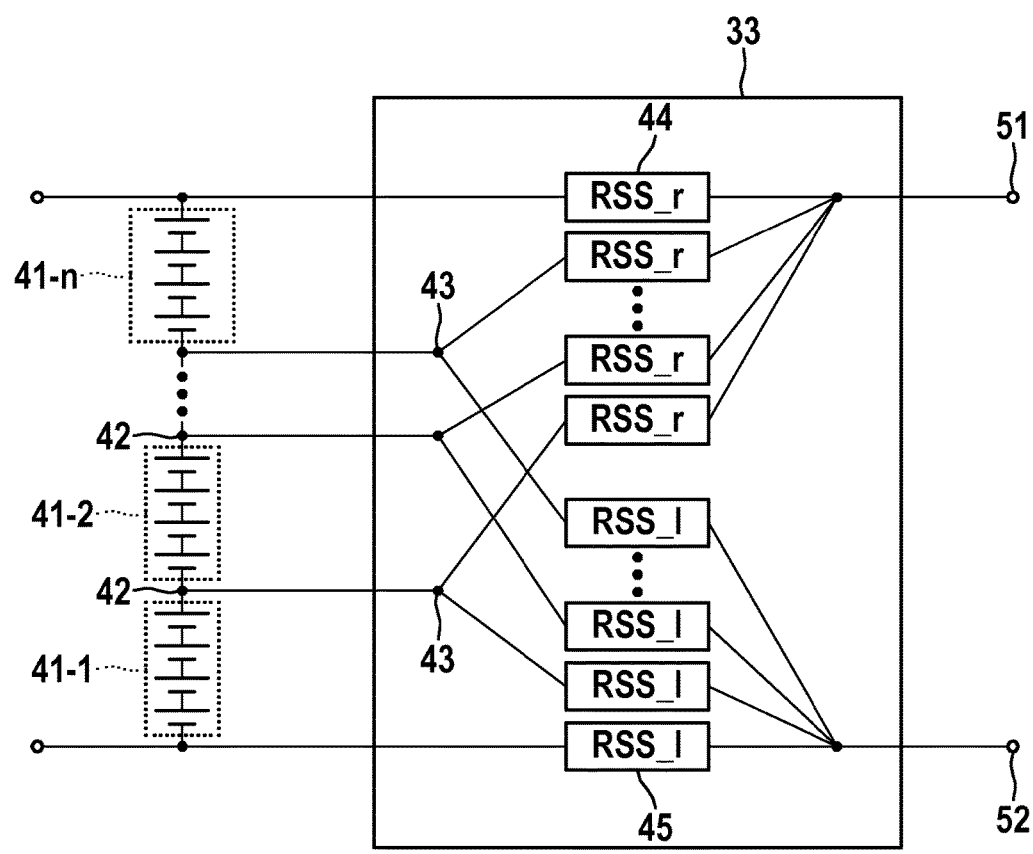
FIG. 5 shows a coupling unit according to an embodiment of the disclosure.

FIG. 5 shows a coupling unit 33 that is embodied as a unidirectional, electrochemical non-isolating DC/DC voltage converter (DC/DC converter). The coupling unit 33 comprises switches with reverse blocking capability 44, 45 that have the property that they allow a flow of current only in one direction in an "on" state and can accept a blocking voltage having both polarities in a second, "off" state. This is a significant difference in relation to simple semiconductor switches, such as e.g. IGBT switches, since these cannot accept a blocking voltage in a reverse direction on account of their intrinsic diode. The dependence on the direction of current flow means that FIG. 5 shows two different switch types, namely RSS_l 45 and RSS_r 44, which do not differ in terms of their manufacture but rather are merely installed with different polarity. An example of the more detailed design of the switches with reverse blocking capability 44, 45 is described with reference to FIG. 8.

In the coupling unit 33, the individual voltage taps 42 of the battery units 41 are each branched at branch points 43 and each supplied to one of the different switches with reverse blocking capability RSS_l 45 and RSS_r 44. The switches with reverse blocking capability RSS_l 45 are connected up to the positive pole 52 on the output side of the coupling unit 33, and the switches with reverse blocking capability RSS_r 44 are connected to the negative pole 51 on the output side of the coupling unit 33.

Figure 6:
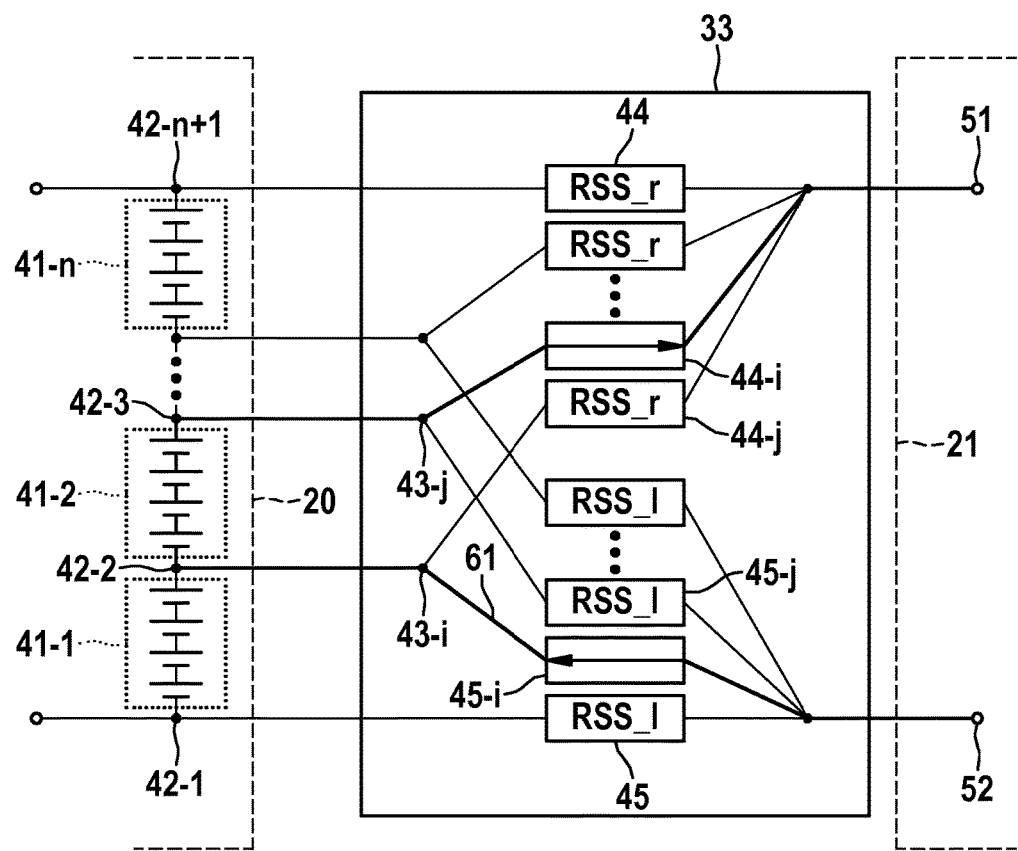
FIG. 6 shows the coupling unit from FIG. 5 in an exemplary operating state.

FIG. 6 shows the supply of power to the low voltage subsystem 21 by way of example from the battery unit 41-2 via the associated taps 42-2 and 42-3. The current path 61 leads from the positive pole 52 via a switch with reverse blocking capability RSS_l 45-*i*, via a branch point 43-*i*, via the voltage tap 42-2, to the connected battery unit 41-2, and from there via the voltage tap 42-3 arranged downstream of the connected battery unit 41-2, via the branch point 43-*j*, via a further switch with reverse blocking capability RSS_r 44-*i*, to the negative pole 51. At the first branch point 43-*i*, a connection also leads to a further switch with reverse blocking capability RSS_r 44-*j*. Since the latter is designed to have reverse blocking capability, a current cannot flow at this location, however. In the case of an ordinary MOSFET switch, said switch would transmit in the reverse direction, which means that the current path would lead not via the battery unit 41-2 but rather via the switch RSS_r 44-*j*. The same applies to the second branch point 43-*j*, which again leads to a switch with reverse blocking capability RSS_l 45-*j* that is off, meaning that no flow of current is possible in this case either.

The voltage of the high voltage subsystem 20 referenced to the ground of the low voltage subsystem 21 is dependent on which of the battery units 41 is connected. In none of the operating states does one of the potentials have an absolute value that exceeds a voltage limit amounting to the sum of the high voltage and the low voltage, however, i.e. approximately 62 volts in the case of a 48 volt system and a 14 volt system. Negative potentials relative to the ground of the low voltage subsystem can appear, however.

The operation of the high voltage generator 23 is independent of the operation of the coupling unit 33 and of the supply of power to the low voltage subsystem. In the connected battery unit 41 that supplies power to the low voltage subsystem 21, an overlay results from the low voltage subsystem current and the charging current possibly supplied to the whole lithium ion battery 40 by the generator 23 (generator mode) or from the discharge current drawn from the whole lithium ion battery 40 (engine mode). So long as the permissible limits of the battery cells, e.g. the maximum permissible discharge current from the cells, are not exceeded, these processes can be considered independently of one another. So that the low voltage subsystem 21 is safely supplied with power, precisely one of the battery units 41 is connected by means of the associated switches 44, 45 of the coupling device 33. The supply of power to the low voltage subsystem 21 on the basis of multiple redundancy means that the presented architecture can be used to design a system that has a very high level of availability for the electric power in the low voltage subsystem.

Figure 7:
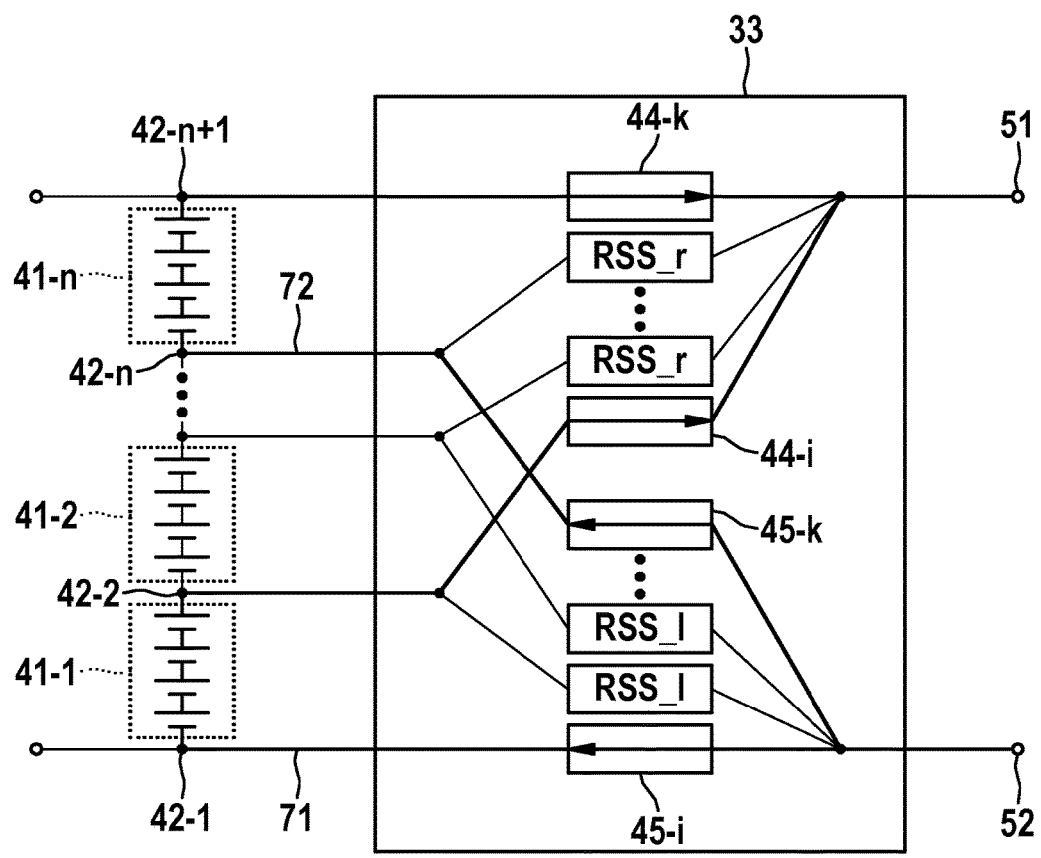
FIG. 7 shows the coupling unit from FIG. 5 during an exemplary changeover process.

FIG. 7 shows a changeover process by means of the coupling unit 33 by way of example from the battery unit 41-1 to the battery unit 41-*n*. Prior to changeover, a first current path 71 leads via a first switch with reverse blocking capability RSS_l 45-*i*, via first voltage taps 42-1, 42-2, which are associated with the first battery unit 41-1, and via a second switch with reverse blocking capability RSS_r 44-*i*, to the negative pole 31. After changeover, the current path 72 leads via a second switch with reverse blocking capability RSS_l 45-*k*, via voltage taps 42-*n*, 42-*n*+1, which are associated with the n-th battery unit 41-*n*, and via a further switch with reverse blocking capability RSS_r 44-*k*, to the negative pole 51.

Changing involves the switches with reverse blocking capability 45-*i*, 44-*i* being switched off and the other switches with reverse blocking capability 45-*k*, 44-*k* being switched on. Were the coupling unit 33 to receive the switching commands for the switches 45-*i*, 44-*i*, 45-*k*, 44-*k* in synch, then the operation of the switches with reverse blocking capability means that the positive pole 52 of the low voltage subsystem would be connected to the higher potential of the two battery elements during the switching phase of the power switches and the negative pole 51 would be connected to the lower potential of the two battery elements during the switching phase, i.e. in the example, to the negative pole of the battery unit 41-*n*. Hence, a much higher voltage would be applied to the low voltage subsystem for a short time than the specification of the low voltage subsystem allows. In the example shown in FIG. 6, the series-connected battery units 41 mean that the low voltage subsystem 21 would be provided with the sum of the partial voltages from the whole battery for a short time. In order to avoid these overvoltages, the procedure when changing over coupling unit 33 is as follows:

changeover is effected such that the switches on the battery element currently carrying current, the battery unit 41-1 in the example shown, are switched off first, and after the switches on the battery element that has carried current hitherto no longer carry current, the switches on the battery element that are intended to undertake the supply of power to the low voltage subsystem are switched on. The principle described is also referred to as "break before make".

When looking at an optimized operating strategy for the onboard electrical system 1 with the series circuit shown for the battery units 41, the considerations that follow are employed. In this case, it is assumed that for uniformly aged cells, the internal resistance and the capacitance of the cells are approximately the same for the same reference conditions, i.e. essentially the same temperature and the same state of charge.

For uniformly aged cells, the maximum outputable power is limited by that cell having the lowest state of charge.

For uniformly aged cells, the maximum drawable power is limited by the cell having the lowest state of charge.

For uniformly aged cells, the maximum permissible power for charging processes is limited by the cell having the highest state of charge.

For uniformly aged cells, the maximum suppliable power is limited by the cell having the highest state of charge.

Since the battery system in a boost recuperation system needs to be capable of storing as much power as possible during a braking process at any time, and at the same time needs to be capable of supporting a boost process as well as possible, it is possible to infer therefrom the requirement that the battery units 41 and the cells they contain must all have the same state of charge as far as possible in order to meet the stipulated requirements as well as possible.

In addition to the requirements for the high voltage subsystem 20, requirements for the starting processes in the low voltage subsystem 21 are also stipulated for the system. So that these requirements are met as well as possible by means of a combination of the high power energy store 28 and the lithium ion battery 40, preferably that battery unit 41 that has the highest state of charge at a given time is used to supply power to the low voltage subsystem.

The requirements for the selection of the switching states of the coupling unit 33 can be met using the following operating strategy: the low voltage subsystem 21 is always supplied with power from that battery element 41 that currently has the highest state of charge. Since the supply of power to the low voltage subsystem is overlaid on the charging and discharge processes in the high voltage subsystem and the supply of power to the low voltage subsystem takes place unidirectionally, this selection specification ensures that the battery element 41 having the highest state of charge is discharged more quickly or is charged more slowly than the other battery units 41. This results in the states of charge of the battery elements being balanced.

So that, when the state of charge of the battery units 41 is the same, there is not a very rapid change from one battery unit 41 to the next, a threshold value for the difference $\Delta SOC_{changeover}$ between the states of charge is introduced, e.g. a difference $\Delta SOC_{changeover}$ having a defined value of between 0.5% and 20%, preferably between 1% and 5%, particularly preferably approximately 2%, that needs to be exceeded so that the supply of power to the low voltage subsystem 21 changes from one battery unit 41 to that battery unit 41 that has a correspondingly higher state of charge than the battery unit 41 that is currently used to supply power to the low voltage subsystem 21. The changeover for the supply of power is always made toward that battery unit 41 that currently has the highest state of charge, and the changeover is made when the battery unit 41 that is currently connected for the purpose of supplying power to the low voltage subsystem 21 has a state of charge that is lower by at least $\Delta SOC_{changeover}$ than the state of charge of that battery unit 41 having the highest state of charge.

Figure 8:
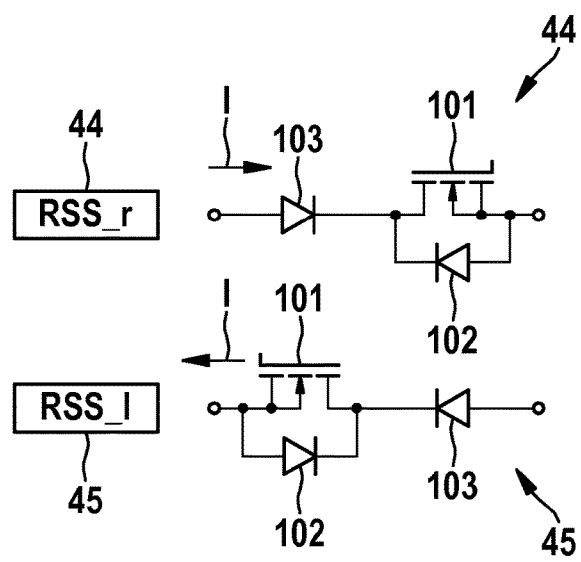
FIG. 8 shows switches with reverse blocking capability.

FIG. 8 shows a possible design for switches with reverse blocking capability 44, 45. In this case, the forward direction is indicated by I. A switch with reverse blocking capability RSS_r 44 comprises an IGBT, MOSFET or bipolar transistor 101 and a diode 103 connected in series therewith, for example. FIG. 8 shows a MOSFET 101 that has an intrinsic diode 102, which is also shown. The diode 103 connected in series with the MOSFET 101 is biased in the opposite direction to the intrinsic diode 102 of the MOSFET 101. The switch with reverse blocking capability RSS_r 44 allows the current to pass in the forward direction I and blocks in the opposite direction. The switch with reverse blocking capability RSS_l 45 corresponds to the RSS_r 44, is merely installed at the opposite polarity, so that the forward and reverse directions are interchanged. The switches RSS_l 45, RSS_r 44 are particularly also distinguished by a barely noticeable delay in the switching processes, i.e. allow a very short changeover period. A suitable actuating circuit can set the time delay between the switches being switched off and switched on very accurately.

The disclosure is not limited to the exemplary embodiments described here and the aspects highlighted therein. Rather, a multiplicity of modifications that lie within the scope of action of a person skilled in the art are possible in the area specified by the disclosure.

The invention claimed is:

1. An onboard electrical system for a motor vehicle, having
a first subsystem having at least one first load configured to operate with a first voltage;
a second subsystem having at least one second load configured to operate with a second voltage, the second voltage being higher than the first voltage, the second subsystem having a battery configured to produce the second voltage and to output the second voltage to the second subsystem, the battery having at least two battery units having individual voltage taps;
an electrical generator;
a coupling unit configured to connect the second subsystem to the first subsystem, the coupling unit being configured to draw power from the second subsystem and to supply the power to the first subsystem, the individual voltage taps of the at least two battery units being routed to the coupling unit, the coupling unit being configured to selectively connect individual ones of the at least two battery units to the first subsystem; and
a controller operably connected to the coupling unit, the controller being configured to (i) ascertain a state of charge of each of the at least two battery units and (ii) operate the coupling unit to connect a battery unit of the at least two battery units that has a highest state of charge to the first subsystem.

2. The onboard electrical system as claimed in claim 1, wherein the at least two battery units are each configured to provide the first voltage.

3. The onboard electrical system as claimed in claim 1, wherein the coupling unit includes switches configured to, in an on state, allow current to flow in only one direction.

4. The onboard electrical system as claimed in claim 1, wherein the first subsystem includes at least one energy store configured to produce the first voltage and to output the first voltage to the first subsystem.

5. The onboard electrical system as claimed in claim 1, wherein the first subsystem includes a starter.

6. A method for operating an onboard electrical system for a motor vehicle, the onboard electrical system including (i) a first subsystem having at least one first load configured to operate with a first voltage, (ii) a second subsystem having at least one second load configured to operate with a second voltage, the second voltage being higher than the first voltage, the second subsystem having a battery configured to produce the second voltage and to output the second voltage to the second subsystem, the battery having at least two battery units having individual voltage taps, (iii) an electrical generator, and (iv) a coupling unit configured to connect the second subsystem to the first subsystem, the individual voltage taps of the at least two battery units being routed to the coupling unit, the coupling unit being configured to selectively connect individual ones of the at least two battery units to the first subsystem, the method comprising:
 ascertaining a state of charge of each of the at least two battery units;
 operating the coupling unit to connect a battery unit of the at least two battery units that has a highest state of charge to the first subsystem;
 drawing power from the second subsystem with the coupling unit; and
 supplying the power to the first subsystem with the coupling unit.

7. The method as claimed in claim 6, further comprising:
 operating the coupling unit to change which of the at least two battery units is connected to the first subsystem in response to a charge difference of the at least two battery units exceeding a threshold value.

8. The method as claimed in claim 6, further comprising:
 disconnecting a current-carrying battery unit of the at least two battery units; and
 connecting, thereafter, a selected further battery unit of the at least two battery units.

9. The method as claimed in claim 6, wherein the method is performed by a computer program that is executed on a programmable computer device.

10. A motor vehicle comprising:
 an internal combustion engine; and
 an onboard electrical system, the onboard electrical system comprising:
  a first subsystem having at least one first load configured to operate with a first voltage;
  a second subsystem having at least one second load configured to operate with a second voltage, the second voltage being higher than the first voltage, the second subsystem having a battery configured to produce the second voltage and to output the second voltage to the second subsystem, the battery having at least two battery units having individual voltage taps;
  an electrical generator;
  a coupling unit configured to connect the second subsystem to the first subsystem, the coupling unit being configured to draw power from the second subsystem and to supply the power to the first subsystem, the individual voltage taps of the at least two battery units being routed to the coupling unit, the coupling unit being configured to selectively connect individual ones of the at least two battery units to the first subsystem; and
  a controller operably connected to the coupling unit, the controller being configured to (i) ascertain a state of charge of each of the at least two battery units and (ii) operate the coupling unit to connect a battery unit of the at least two battery units that has a highest state of charge to the first subsystem.

\* \* \* \* \*

UNITED STATES PATENT AND TRADEMARK OFFICE
CERTIFICATE OF CORRECTION

PATENT NO. : 10,071,646 B2  
APPLICATION NO. : 15/114550  
DATED : September 11, 2018  
INVENTOR(S) : Holger Fink Page 1 of 1

It is certified that error appears in the above-identified patent and that said Letters Patent is hereby corrected as shown below:

On the Title Page

Item (30) should read:  
(30) Foreign Application Priority Data  
Jan. 27, 2014 (DE) ..................... 10 2014 201 345

Signed and Sealed this  
Fourteenth Day of May, 2019

Andrei Iancu  
*Director of the United States Patent and Trademark Office*